United States Patent
Goto et al.

(10) Patent No.: US 7,276,014 B2
(45) Date of Patent: Oct. 2, 2007

(54) VEHICLE STABILITY CONTROL SYSTEM FOR ENHANCED TRANSFER CASE COMPATIBILITY

(75) Inventors: Shiro Goto, Plymouth, MI (US); Russell Monahan, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 260 days.

(21) Appl. No.: 10/981,975

(22) Filed: Nov. 5, 2004

(65) Prior Publication Data
US 2006/0100062 A1    May 11, 2006

(51) Int. Cl.
*B60W 10/04* (2006.01)
*B60W 10/10* (2006.01)
*F16D 48/06* (2006.01)
*B60T 7/12* (2006.01)
*B60K 28/16* (2006.01)

(52) U.S. Cl. .................. 477/94; 477/171; 192/219; 701/88; 180/197

(58) Field of Classification Search ............. 477/71, 477/94, 903, 170, 171, 180, 174, 115; 475/150, 475/231, 249; 192/220, 220.1, 219, 3.54; 701/69, 71, 72, 82, 83, 84, 88; 180/197, 180/248, 249
See application file for complete search history.

(56) References Cited

U.S. PATENT DOCUMENTS

| 4,417,641 | A |   | 11/1983 | Kageyama |
| 4,671,373 | A | * | 6/1987 | Sigl ............................ 180/197 |
| 5,927,426 | A |   | 7/1999 | Hall et al. |
| 5,941,613 | A | * | 8/1999 | Tagawa ...................... 303/190 |
| 6,208,929 | B1 | * | 3/2001 | Matsuno et al. ............... 701/89 |
| 6,219,609 | B1 | * | 4/2001 | Matsuno et al. ............... 701/72 |
| 6,292,734 | B1 | * | 9/2001 | Murakami et al. ............ 701/84 |
| 6,564,140 | B2 | * | 5/2003 | Ichikawa et al. ............. 701/91 |
| 6,702,717 | B2 | * | 3/2004 | Murakami ................... 477/182 |
| 6,755,763 | B1 | * | 6/2004 | Goto et al. .................. 475/231 |
| 2004/0041358 | A1 |  | 3/2004 | Hrovat et al. |

* cited by examiner

*Primary Examiner*—Roger Pang
(74) *Attorney, Agent, or Firm*—Brinks Hofer Gilson & Lione

(57) ABSTRACT

A vehicle stability control system includes a controller configured to deactivate a traction control clutch, provide a reverse torque across the traction control clutch, and apply a braking torque according to a vehicle stability control strategy. The reverse torque across the traction control clutch may be provided by reducing an engine torque output, applying a pulse of brake pressure, or other means.

17 Claims, 5 Drawing Sheets

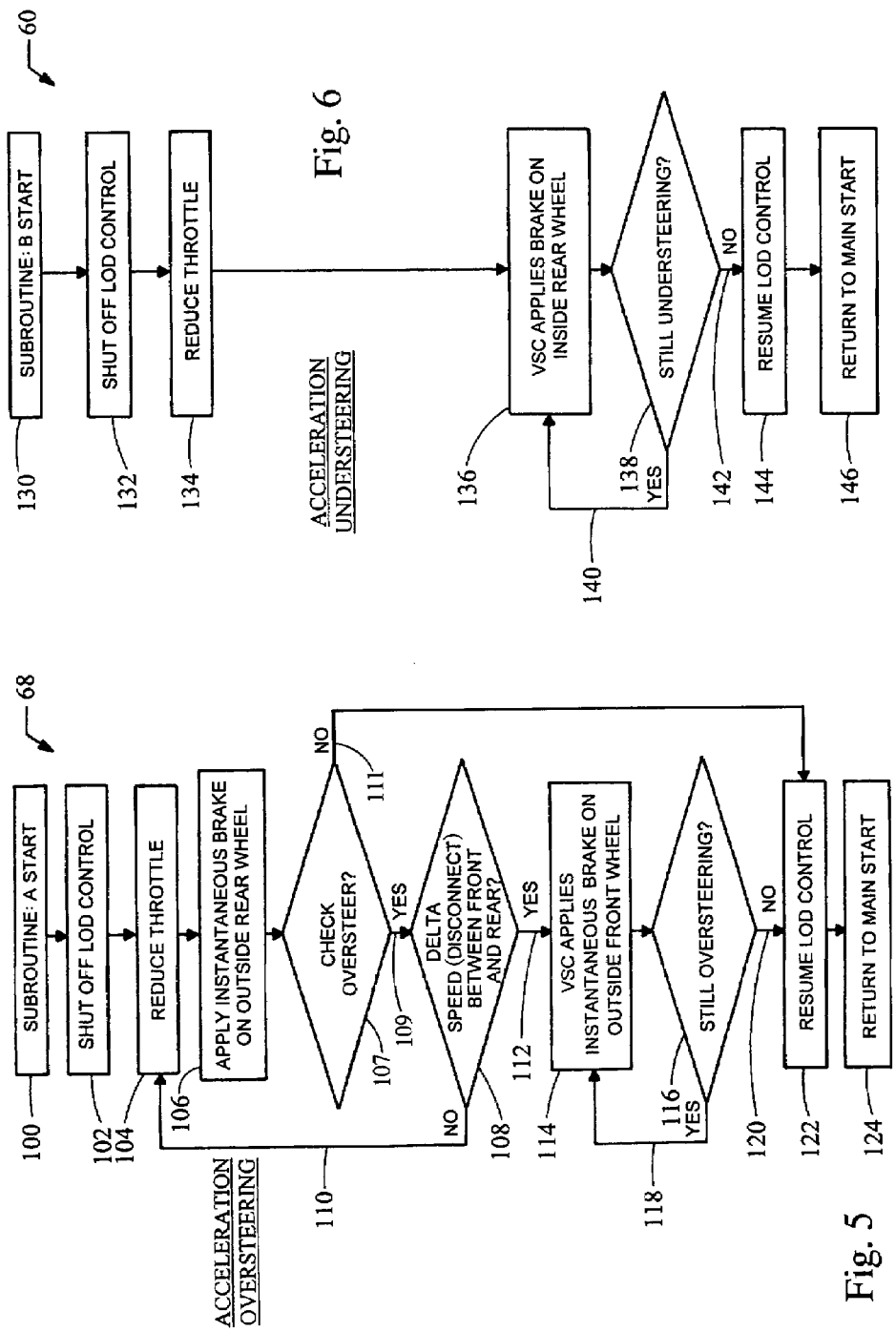

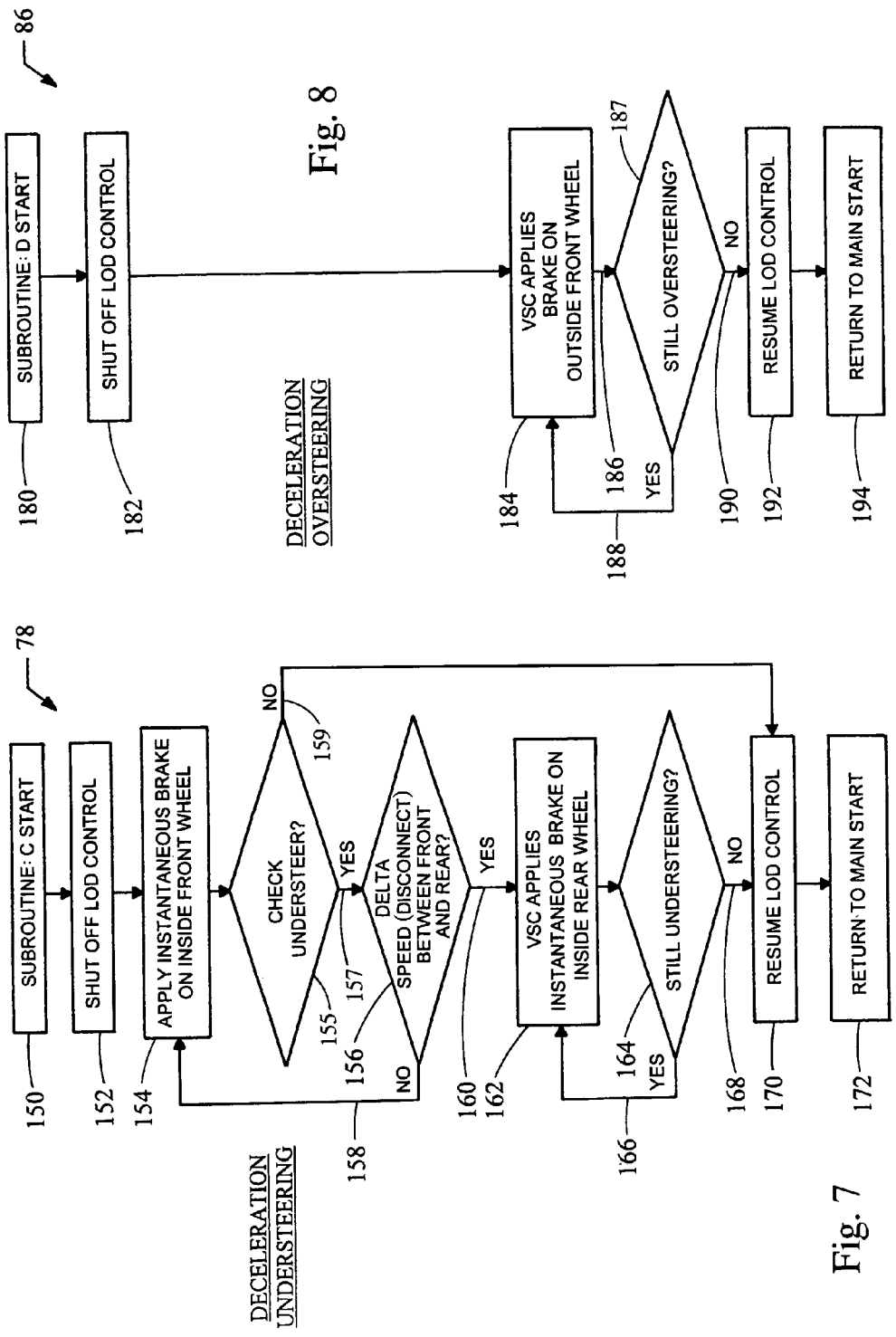

VEHICLE STABILITY CONTROL SYSTEM FOR ENHANCED TRANSFER CASE COMPATIBILITY

BACKGROUND

1. Field of the Invention

The present invention generally relates to a vehicle drive train control system. More specifically, the invention relates to a vehicle drive train control system configured to disengage a traction control clutch.

2. Description of Related Art

Currently, automotive OEMs are introducing brake based vehicle stability control systems that use vehicle sensors, such as, wheel speed, yaw rate and steering angle sensors to detect when the vehicle is traveling in a direction different from the direction intended by the driver. Such systems use a steering wheel angle sensor to detect the intended direction of the vehicle. A yaw or yaw rate sensor and the existing wheel speed sensors from the ABS are used to detect the actual direction and speed of the vehicle. By comparing the intended direction and the actual direction, the electronic controls will apply braking torque to one or more wheels to bring the vehicle back to the direction intended.

For example, the vehicle stability control system will, typically, apply the outside front brake during an oversteer condition. The vehicle stability control system will apply the inside rear brake when an understeer is detected. In addition, the vehicle stability control system may automatically reduce the throttle to minimize the chances for loss of control. However, vehicle stability control systems have limitations with regard to traditional vehicle stability and traction control systems.

Currently, vehicle stability control systems are not installed on vehicles with locking rear differentials or locking transfer cases. A locking differential locks the right and left wheels together to improve traction, preventing one wheel from slipping. If the vehicle stability traction control system applies braking action to a wheel on the one side, both wheels would be effectively braked through the locking differential engagement. Similarly, a transfer case that locks the front and rear axles together would limit the effectiveness of the vehicle stability control system. Locking the front and rear axles together prevents the independent application of braking torque to only one wheel. Even if the clutch locking the differential or transfer case is turned off immediately upon the onset of the vehicle stability control system, the differential or transfer clutch mechanism may not be disengaged quickly or effectively enough to prevent interference with the vehicle stability control system.

Under some circumstances, the application of brake torque to certain wheels will lock the differential or transfer case clutches into engagement even more. For example, if a roller clutch locking differential is locked into engagement when the vehicle is decelerating hard while turning in an understeer condition, application of the inside rear brake will keep the roller clutch stuck in the engaged position even if the engagement signal is interrupted. This stuck condition only makes the control problem worse. Similarly, during heavy deceleration while turning left, the roller clutch will be engaged so that an outer race attached to the right wheel is trying to overrun an inner race attached to the left wheel, because of the larger turning radius of the outside wheel. Therefore, the heavy deceleration locks the roller clutch into one side of the engagement wedge, effectively locking the right and left wheels together, despite their different turning radil. For clarity, the inside will be used to refer to the side of the vehicle toward which the vehicle is turning. Similarly, the outside will be used to refer to the side of the vehicle away from which the vehicle is turning. Therefore, if the vehicle is making a right turn, the inside would be the right side of the vehicle, typically the passenger side in the United States.

In an understeer condition, the vehicle stability control system will apply brake torque to the inside rear wheel to correct the vehicle. The inside wheel in a left turn is the left wheel that is attached to the inner race. Again the braking torque locks the clutch even harder into engagement thereby defeating the vehicle stability control system.

Other locking clutch systems such as dog clutches or pin lockers would also be locked into engagement because of the inherent friction between the clutch components. For example, when the normal braking torque is fed across the mating gear type components of a dog clutch, the friction between the teeth prevents the gears from being easily separated thereby keeping the clutch locked in the engaged position. Similarly, even a small braking torque across a pin locker locking differential will keep the pins pressed against a receiver socket, preventing them from being pushed back out of their engaged positions, thereby keeping the differential locked. Further, clutch pack limited slip differentials rely on a cam mechanism that must be unwound by reverse rotation of the two sides of the differential, inhibiting the release of the clutch mechanism when residual braking torque is still present across the clutch. Accordingly, automotive OEMs decline to offer vehicle stability control systems on vehicles with locking differentials or locking transfer cases.

Vehicle stability control systems can provide an improvement with regard to traction by applying the brake to the slipping wheels, thereby forcing drive torque in the non-slipping wheels. However, such activity results in excessive wear of brake pads and rotors, and can even cause overheating of the braking system. Therefore, it would be desirable to use a vehicle stability control system that can operate in a vehicle with a locking transfer case or locking differential.

In view of the above, it is apparent there is a need for an improved vehicle stability control system.

SUMMARY OF THE INVENTION

In satisfying the above need, as well as overcoming the enumerated drawbacks and other limitations of the related art, the present invention provides an improved vehicle stability control system.

The vehicle stability control system includes a controller configured to deactivate the traction control clutch, apply a braking torque according to a vehicle stability control strategy and provide a reverse torque across the traction control clutch.

In another aspect of the present invention, the controller is configured to provide a reverse torque across the traction control clutch by reducing an engine torque output.

In another aspect of the present invention, the controller is configured to provide reverse torque across the traction control clutch by applying a pulse of brake pressure. The pulse of brake pressure may be, but is not limited to, about 200 milliseconds at a pressure of about 500 to 600 psi.

In yet another aspect of the present invention, the controller is configured to monitor the traction control clutch for disengagement based on wheel speed sensors.

In another aspect of the present invention, the controller is configured to detect an oversteering and acceleration condition. The controller is further configured to apply a brake pulse to the outside rear brake and apply brake pressure to the outside front brake after the controller has detected disengagement of the traction control clutch.

In another aspect of the present invention, the controller is configured to detect an understeer and acceleration condition. The controller is further configured to apply a brake pulse to the inside rear brake and reduce the throttle to provide a reverse torque across the traction control clutch. The controller applies brake pressure to the inside rear brake after the controller has detected disengagement of the traction control clutch.

In yet another aspect of the present invention, the controller is configured to detect an oversteer and deceleration condition. The controller applies a brake pulse to the outside front brake to provide a reverse torque across the traction control clutch. After the controller has detected disengagement of the transfer control clutch, brake pressure is applied to the outside front brake according to the vehicle stability control strategy.

In yet another aspect of the present invention, the controller is configured to detect an understeer and deceleration condition. The controller applies a brake pulse to the inside front brake to provide a reverse torque across the traction control clutch. After the controller has detected disengagement of the transfer control clutch, brake pressure is applied to the inside rear brake.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 5 is a flow chart for a vehicle stability control system in an acceleration and oversteering mode;

FIG. 6 is a flow chart for a vehicle stability control system in a acceleration understeering mode;

FIG. 7 is a flow chart for a vehicle stability control system in a deceleration understeering mode; and FIG. 8 is a flow chart for a vehicle stability control system in a deceleration oversteering mode.

DETAILED DESCRIPTION OF THE INVENTION

Figure 1:
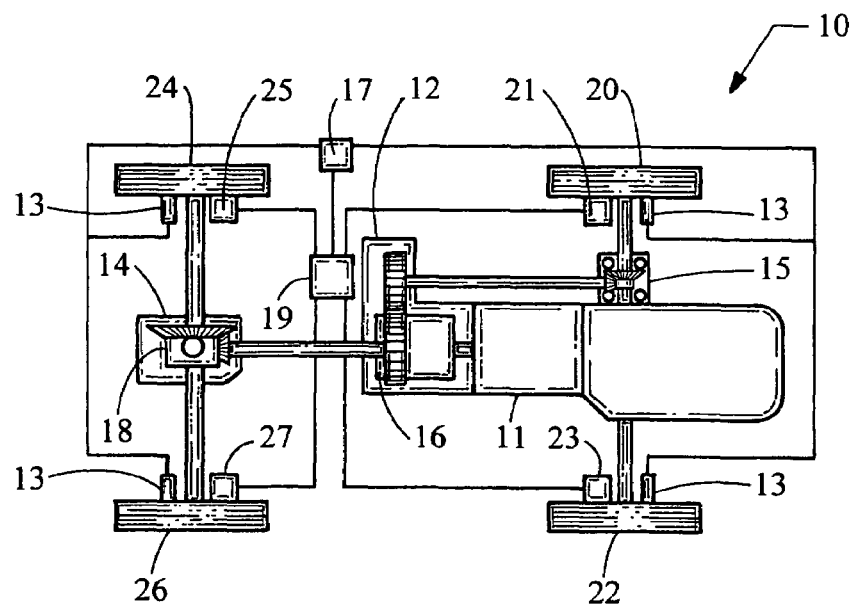
FIG. 1 is a diagrammatic view of a drive train and vehicle stability control system according to the present invention.

Referring now to FIG. 1, a system embodying the principles of the present invention is illustrated therein and designated at 10. As its primary components, the system 10 includes a controller 17, a braking system 19, a front left brake 21, a front right brake 23, a left rear brake 25, and a right rear brake 27. The vehicle also has a drive train system including a transmission 11, a transfer case 12, a rear differential 14, and a front differential 15. The transfer case 12 has a clutch 16 configured to lock the drive between the front wheels 20, 22 and rear wheels 24, 26. Similarly, the rear differential 14 includes a clutch 18 for locking the drive between the rear left wheel 24 and rear right wheel 26.

Figure 2:
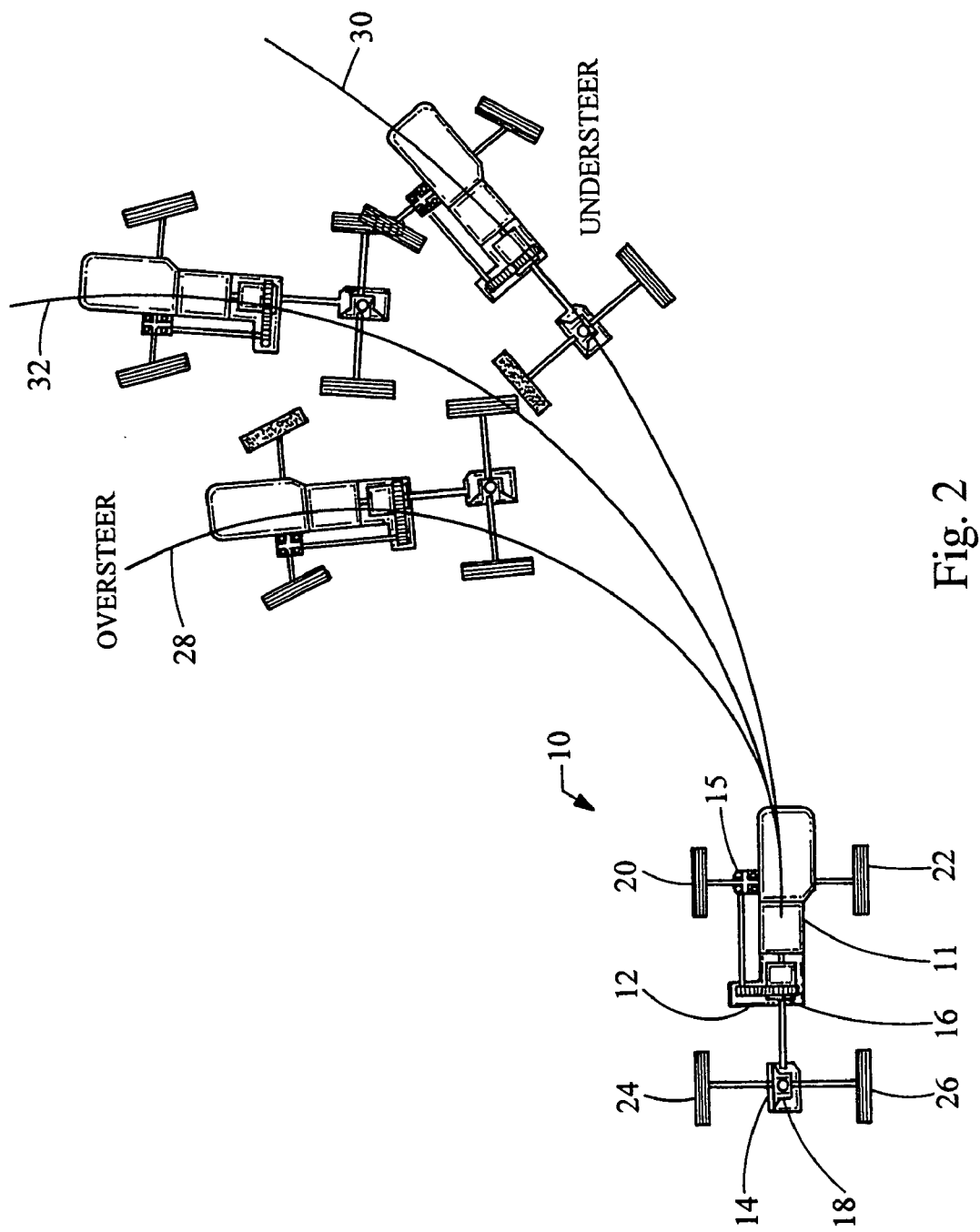
FIG. 2 is a diagrammatic view of a vehicle illustrating an oversteer and understeer condition.

Now referring to FIG. 2, an understeer condition 30 and oversteer condition 28 are depicted. Under ideal conditions, the intended vehicle direction 32, as indicated by the steering wheel angle, matches the actual direction of the car. However, occasionally the actual vehicle direction will differ from the intended vehicle direction. An oversteer condition occurs when the vehicle turns more than intended as indicated by the steering wheel angle. Alternatively, an understeer condition 30 is when the vehicle turns less than desired as indicated by the steering wheel angle.

Clutches 16 and 18 will be referred to as traction control clutches. Traction control clutches will be used to indicate clutches configured to lock the drive between one or more wheels of the vehicle. Traction control clutches would include clutches such as locking differential clutches or transfer case clutch mechanisms.

Figure 3:
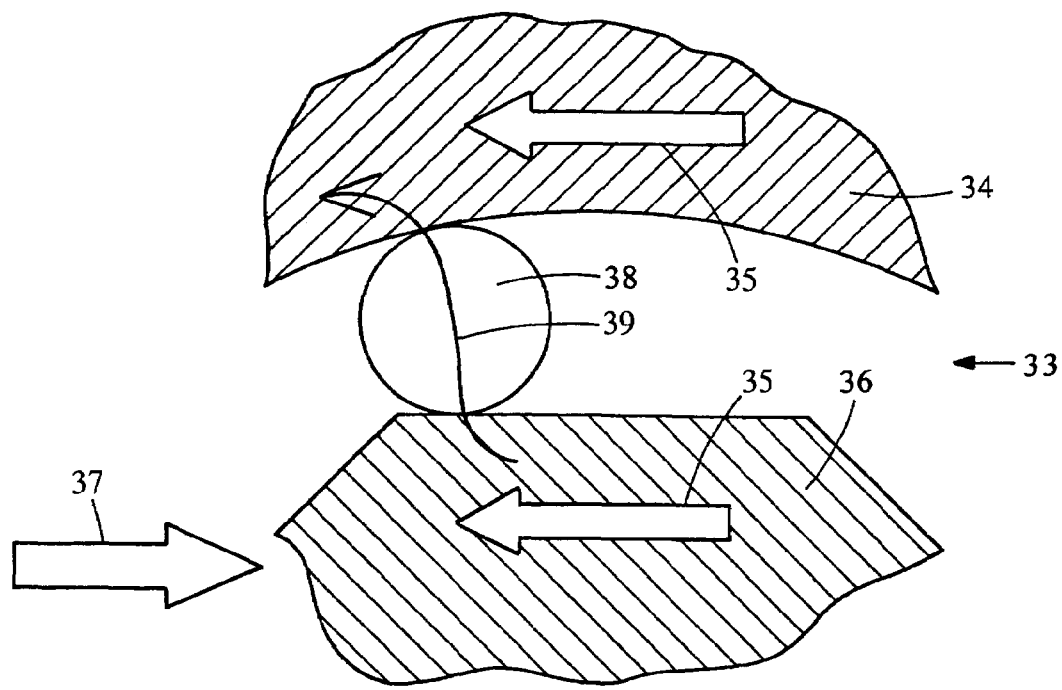
FIG. 3 is a cutaway view of a clutch illustrating a locking condition of the clutch.

FIG. 3 shows a traction control clutch in the engaged position. The clutch 33 has an outer race 34 and an inner race 36. When the clutch 33 is activated, the roller 38 engages the outer race 34 and the inner race 36 transmitting torque therebetween. Further, the direction of rotation of the inner and outer race 34, 36 is denoted by arrows 35. If a braking force 37 is applied to a wheel connected to the inner race 36 while the clutch 33 is engaged, the roller 38 will become further lodged between the inner and outer race 36, 34, as denoted by arrow 39. Therefore, the clutch 33 will remain engaged even if the clutch 33 is deactivated. As such, the braking of the vehicle stability control system is applied through the clutch 33 to multiple wheels and does not have the intended effect to stabilize the vehicle. The controller 17 is configured to implement a vehicle stability control strategy that includes further adaptations to work in conjunction with a traction control clutch. A method and logic for implementing a vehicle stability control strategy is further depicted in FIG. 4.

Figure 4:
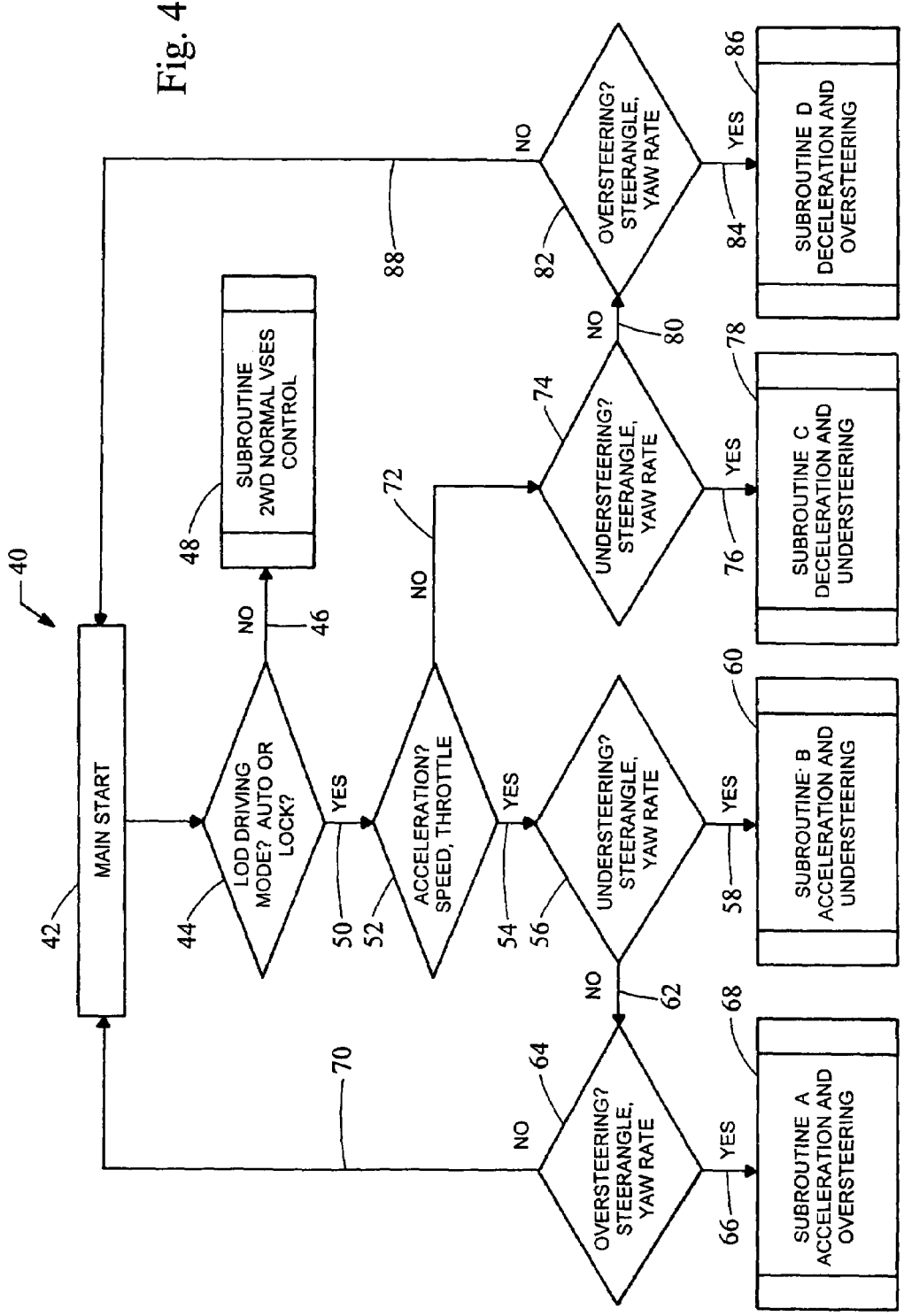
FIG. 4 is a flow chart of a vehicle stability control system according to the present invention.

Now referring to FIG. 4, the method 40 is initiated in block 42. In block 44, the controller determines if the traction control clutch is activated connecting the front and rear wheel drives. If the traction control clutch is not activated, the method follows line 46 and a normal vehicle stability control (VSC) strategy is implemented as if no traction control clutch existed as denoted by block 48. If the traction control clutch is activated, the method follows along line 50 and the controller determines if the vehicle is in an acceleration or deceleration mode as denoted by block 52. If the vehicle is in an acceleration mode, the logic follows line 54 and the controller determines if an understeering mode exists as denoted by block 56. An understeering condition can be determined based on a comparison between the steering wheel angle and yaw rate. If an understeering condition exists, a logic follows line 58 and an acceleration mode and understeering mode strategy is implemented as denoted by block 60. If an understeering mode does not exist, the logic flows along line 62 to block 64. In block 64, the controller determines if an oversteering mode exists by comparing the steering wheel angle and the yaw rate. If an oversteering mode exists, the logic follows along line 66 and an acceleration mode and oversteering mode strategy is implemented as denoted by block 68. If an oversteering mode does not exist in block 64, the logic follows along line 70 where the method is restarted in block 42.

Referring again to block 52, if the vehicle is not in an acceleration mode, the logic follows along line 72. In block 74, the controller determines if an understeering mode exists. If an understeering mode exists, the logic follows along line 76 to block 78, where an deceleration and understeering mode strategy is implemented. If an understeering mode does not exist in block 74, the logic follows along line 80 to block 82. In block 82, the controller determines if an oversteering mode exists. If an oversteering mode exists, the logic follows along line 84 to block 86, where a deceleration and oversteering mode strategy is implemented. If an oversteering mode is not determined in block 82, the logic follows along line 88 to the start of the process in block 42.

Now referring to FIG. 5, an acceleration and oversteering mode strategy is denoted by method 68. The method 68 is initiated by block 100 and the traction control clutch is deactivated as denoted by block 102. In block 104, the throttle is reduced to lower the engine output thereby causing a reverse torque across the clutch. Further, in block 106, a pulse of brake pressure is applied on the outside rear wheel also causing a reverse torque across the clutch. The pulse of brake pressure may be for a duration of about 200 milliseconds and in the range of 500 to 600 psi. However, the duration or pressure may be modified based on vehicle parameters, and the pulse may be applied over a period of time at a frequency of between 1 to 50 Hz.

In block 107, the controller checks if an oversteering condition exists. If an oversteering condition does not exist, the method follows line 111 and the traction control clutch strategy is resumed in block 122. Otherwise, the logic follows line 109 to block 108.

In block 108, the controller checks the speed difference between the front and rear wheels to determine if the clutch is disengaged. The difference between the front and rear wheels may be determined based on the wheel speed sensors of the antilock braking system. If the transfer case clutch has not disengaged, logic follows along line 110 to block 104 and further attempts disengaging the traction control clutch. If the traction control clutch is disengaged, the logic follows along line 112 to block 114. To correct for the acceleration and oversteering mode, the vehicle stability control system applies brake pressure on the outside front wheel as denoted in block 114. In block 116, the controller monitors the amount of oversteering. If the vehicle is still oversteering, the logic follows along line 118 to block 114 to apply brake pressure to further correct for the oversteering mode. If the oversteering is corrected in block 116, the logic follows along line 120. In block 122, the traction control clutch strategy is resumed and the vehicle stability control logic is restarted as denoted by block 124. In addition, a delay period may be used before the control clutch is re-energized to allow the system to stabilize. The acceleration oversteering mode described can be applied to both the transfer case clutches as well as electronic locking differentials.

Now referring to FIG. 6, an acceleration and understeering mode strategy is denoted by method 60. The method 60 is initiated by block 130 and the traction control clutch is deactivated as denoted by block 132. In block 134, the throttle is reduced to lower the engine output thereby causing a reverse torque across the clutch. To correct for the acceleration and understeering mode, the vehicle stability control system applies brake pressure on the inside rear wheel as denoted in block 136. In block 138, the controller monitors the amount of understeering. If the vehicle is still understeering, the logic follows along line 140 to block 136 to apply brake pressure to further correct for the understeering mode. If the understeering is corrected in block 138, the logic follows along line 142. In block 144, the traction control clutch strategy is resumed and the vehicle stability control logic is restarted as denoted by block 146. In addition, a delay period may be used before the control clutch is re-energized to allow the system to stabilize.

Now referring to FIG. 7, a deceleration and understeering mode strategy is denoted by method 78. The method 78 is initiated by block 150 and the traction control clutch is deactivated as denoted by block 152. Further, in block 154, a pulse of brake pressure is applied on the inside front wheel causing a reverse torque across the clutch. The pulse of brake pressure may be for a duration of about 200 milliseconds and in the range of 500 to 600 psi. However, the duration or pressure may be modified based on the vehicle parameters, and the pulse may be applied over a period of time at a frequency of between 1 to 50 Hz.

In block 155, the controller checks if an understeer condition exists. If an understeer condition does not exist, the logic follows line 159 and the traction control clutch strategy is resumed in block 170. Otherwise, the logic follows line 157 to block 156.

In block 156, the controller checks the speed difference between the front and rear wheels to determine if the clutch is disengaged. The difference between the front and rear wheels may be determined based on the wheel speed sensors of the antilock braking system. If the transfer case clutch has not disengaged, logic follows along line 158 to block 154 further attempting to disengage the traction control clutch. If the traction control clutch is disengaged, the logic follows along line 160 to block 162. To correct for the acceleration and understeering mode, the vehicle stability control system applies brake pressure on the inside rear wheel as denoted in block 162. In block 164, the controller monitors the amount of understeering. If the vehicle is still understeering, the logic follows along line 166 to block 162 to apply brake pressure to further correct for the understeering mode. If the understeering is corrected in block 164, the logic follows along block 168. In block 170, the traction control clutch strategy is resumed and the vehicle stability control logic is restarted as denoted by block 172. In addition, a delay period may be used before the control clutch is re-energized to allow the system to stabilize.

Now referring to FIG. 8, a deceleration and oversteering mode strategy is denoted by method 86. The method 86 is initiated by block 180 and the traction control clutch is deactivated as denoted by block 182. To correct for the deceleration and oversteering mode, the vehicle stability control system applies brake pressure on the outside front wheel as denoted in block 184. In block 187, the controller monitors the amount of oversteering. In this mode, the brake pressure on the outside front wheel also serves to disengage the traction control clutch. If the vehicle is still oversteering, the logic follows along line 188 to block 184 to apply brake pressure to further correct for the oversteering mode. If the oversteering is corrected in block 187, the logic follows along line 190. In block 192, the traction control clutch strategy is resumed and the vehicle stability control logic is restarted as denoted by block 194.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A vehicle stability control system for a vehicle, the vehicle having a traction control clutch, the vehicle stability control system comprising a controller configured to deactivate the traction control clutch, provide a reverse torque across the traction control clutch, and apply a braking torque according to a vehicle stability control strategy, the controller being further configured to detect an oversteering and acceleration condition, the controller being further configured to apply brake pressure to the outside front brake after the controller has detected the traction control clutch disengagement.

2. A vehicle stability control system for a vehicle, the vehicle having a traction control clutch, the vehicle stability control system comprising a controller configured to deactivate the traction control clutch, provide a reverse torque across the traction control clutch, and apply a braking torque according to a vehicle stability control strategy, the controller being further configured to detect an understeering and deceleration condition, the controller being further configured to apply brake pressure to the inside rear brake after the controller has detected the traction control clutch disengagement.

3. A vehicle stability control system for a vehicle, the vehicle having a traction control clutch, the vehicle stability control system comprising a controller configured to deactivate the traction control clutch, provide a reverse torque across the traction control clutch, and apply a braking torque according to a vehicle stability control strategy, the controller being further configured to detect an oversteer and acceleration condition, the controller being further configured to apply a brake pulse to the outside rear brake to disengage the traction control clutch.

4. A vehicle stability control system for a vehicle, the vehicle having a traction control clutch, the vehicle stability control system comprising a controller configured to deactivate the traction control clutch, provide a reverse torque across the traction control clutch, and apply a braking torque according to a vehicle stability control strategy, the controller being further configured to detect an understeer and deceleration condition, the controller being further configured to apply a brake pulse to the inside front brake to disengage the traction control clutch.

5. A vehicle stability control system for a vehicle, the vehicle having a traction control clutch, the vehicle stability control system comprising a controller configured to deactivate the traction control clutch, provide a reverse torque across the traction control clutch, monitor the traction control clutch for disengagement and apply a braking torque according to a vehicle stability control strategy.

6. The vehicle stability control system according to claim 5, wherein the controller is configured to provide a reverse torque across the traction control clutch by reducing torque output from the engine.

7. The vehicle stability control system according to claim 6, wherein the controller is configured to provide reverse torque across the traction control crutch by applying a pulse of brake pressure.

8. The vehicle stability control system according to claim 6, wherein the controller is configured to apply a pulse of brake pressure at a frequency of about 1 to 50 Hz.

9. The vehicle stability control system according to claim 5, wherein the controller is configured to monitor the traction control clutch for disengagement based on wheel speed sensors.

10. The vehicle stability control system according to claim 5, wherein the controller is configured to detect an oversteer and acceleration condition, the controller being further configured to apply a brake pulse to the outside rear brake and apply brake pressure to the outside front brake after the controller has detected the transfer clutch disengagement.

11. The vehicle stability control system according to claim 5, wherein the controller is configured to detect an understeer and deceleration condition, the controller being further configured to apply a brake pulse to the inside front brake and apply brake pressure to the inside rear brake after the controller has detected the traction control clutch disengagement.

12. The vehicle stability control system according to claim 5, wherein the controller is configured to detect an oversteer and acceleration condition, the controller being further configured to apply a brake pulse to the outside rear brake to disengage the traction control clutch.

13. The vehicle stability control system according to claim 5, wherein the controller is configured to detect an oversteer and acceleration condition, the controller being further configured to reduce torque output from the engine.

14. The vehicle stability control system according to claim 5, wherein the controller is configured to determine an understeer and acceleration condition, the controller being further configured to apply a brake pulse to the inside rear brake.

15. The vehicle stability control system according to claim 5, wherein the controller is configured to detect an understeer and acceleration condition, the controller being further configured to reduce torque output from the engine.

16. The vehicle stability control system according to claim 5, wherein the controller is configured to detect an oversteer and deceleration condition, the controller being further configured to apply a brake pulse to the outside front brake.

17. The vehicle stability control system according to claim 5, wherein the controller is configured to detect an understeer and deceleration condition, the controller being further configured to apply a brake pulse to the inside front brake to disengage the traction control clutch.

* * * * *